United States Patent
Shapiro et al.

(10) Patent No.: US 9,117,349 B2
(45) Date of Patent: Aug. 25, 2015

(54) SECURITY SYSTEM HAVING SEGREGATED OPERATING SOFTWARE

(71) Applicant: ADT US HOLDINGS, INC., Boca Raton, FL (US)

(72) Inventors: Steven Shapiro, Lake Worth, FL (US); Raymond North, Boca Raton, FL (US); Timothy Albert Rader, Lake Worth, FL (US); Jorge Perdomo, Boca Raton, FL (US); Anne-Marie Rouse, Wellington, FL (US); James Timothy Black, Delray Beach, FL (US)

(73) Assignee: ADT US Holdings, Inc., Boca Raton, FL (US)

( * ) Notice: Subject to any disclaimer, the term of this patent is extended or adjusted under 35 U.S.C. 154(b) by 0 days.

(21) Appl. No.: 14/216,177

(22) Filed: Mar. 17, 2014

(65) Prior Publication Data

US 2014/0197949 A1 Jul. 17, 2014

Related U.S. Application Data

(63) Continuation of application No. 14/180,648, filed on Feb. 14, 2014, which is a continuation of application No. 13/560,679, filed on Jul. 27, 2012, now Pat. No. 8,665,084.

(60) Provisional application No. 61/513,003, filed on Jul. 29, 2011, provisional application No. 61/790,675, filed on Mar. 15, 2013.

(51) Int. Cl.
*G08B 1/08* (2006.01)
*G08B 3/10* (2006.01)
(Continued)

(52) U.S. Cl.
CPC .. *G08B 3/10* (2013.01); *G06F 1/30* (2013.01); *G06F 1/3234* (2013.01);
(Continued)

(58) Field of Classification Search
CPC . G06F 1/3234; G06B 13/19684; G06B 25/08
USPC ......... 340/539.1, 539.22, 506, 517, 640, 541, 340/567, 628, 632, 40
See application file for complete search history.

(56) References Cited

U.S. PATENT DOCUMENTS

| 4,575,640 A | 3/1986 | Martin |
|---|---|---|
| 4,908,523 A | 3/1990 | Snowden et al. |

(Continued)

FOREIGN PATENT DOCUMENTS

| EP | 1 701 475 A1 | 9/2006 |
|---|---|---|
| EP | 2081334 A1 | 7/2009 |
| WO | 2013/019659 A1 | 2/2013 |

OTHER PUBLICATIONS

International Search Report and Written Opinion dated Jul. 25, 2014 for International Application Serial No. PCT/US2014/030513, International Filing Date: Mar. 17, 2014, consisting of 12 pages.

(Continued)

*Primary Examiner* — Tai T Nguyen
(74) *Attorney, Agent, or Firm* — Christopher & Weisberg, P.A.

(57) ABSTRACT

A control apparatus for a premises based system is provided. The control apparatus has an improved memory and processor configuration for separate operation of the life safety and life style code so that the operation of the life style code may be changed without changing the operation of the life safety code, such as through the use of a virtual machine or code running at a single operating system layer. The memory may store life safety code in a first partition and life style code in a second partition. The life style code may be updated while life safety code continues to run.

23 Claims, 11 Drawing Sheets

(51) Int. Cl.
    *G06F 1/32*         (2006.01)
    *G08B 13/196*     (2006.01)
    *G08B 25/08*      (2006.01)
    *G08B 25/10*      (2006.01)
    *G08B 25/14*      (2006.01)
    *G08B 29/18*      (2006.01)
    *H02J 9/00*       (2006.01)
    *H04L 12/28*      (2006.01)
    *G06F 1/30*       (2006.01)
    *G08B 25/00*      (2006.01)

(52) U.S. Cl.
    CPC ......... *G08B 13/19684* (2013.01); *G08B 25/08* (2013.01); *G08B 25/10* (2013.01); *G08B 25/14* (2013.01); *G08B 29/181* (2013.01); *H02J 9/002* (2013.01); *H04L 12/2838* (2013.01); *G08B 25/004* (2013.01)

(56) References Cited

U.S. PATENT DOCUMENTS

| | | |
|---|---|---|
| 5,565,853 A | 10/1996 | Jun-Young |
| 5,640,142 A | 6/1997 | Matatall, Jr. et al. |
| 5,748,079 A | 5/1998 | Addy |
| 5,801,626 A | 9/1998 | Addy |
| 5,822,373 A | 10/1998 | Addy |
| 5,828,300 A | 10/1998 | Addy et al. |
| 5,936,544 A | 8/1999 | Gonzales et al. |
| 6,026,165 A | 2/2000 | Marino et al. |
| 6,028,513 A | 2/2000 | Addy |
| 6,084,522 A | 7/2000 | Addy |
| 6,087,933 A | 7/2000 | Addy et al. |
| 6,137,402 A | 10/2000 | Marino |
| 6,150,936 A | 11/2000 | Addy |
| 6,167,137 A | 12/2000 | Marino et al. |
| 6,188,318 B1 | 2/2001 | Katz et al. |
| 6,201,472 B1 | 3/2001 | Linford et al. |
| 6,208,694 B1 | 3/2001 | Addy |
| 6,229,997 B1 | 5/2001 | Addy |
| 6,236,313 B1 | 5/2001 | Eskildsen et al. |
| 6,243,010 B1 | 6/2001 | Addy et al. |
| 6,252,501 B1 | 6/2001 | Tice et al. |
| 6,255,944 B1 | 7/2001 | Addy |
| 6,288,639 B1 | 9/2001 | Addy |
| 6,294,992 B1 | 9/2001 | Addy et al. |
| 6,326,880 B1 | 12/2001 | Tice |
| 6,351,214 B2 | 2/2002 | Eskildsen et al. |
| 6,445,291 B2 | 9/2002 | Addy et al. |
| 6,445,292 B1 | 9/2002 | Jen et al. |
| 6,462,652 B1 | 10/2002 | McCuen et al. |
| 6,472,993 B1 | 10/2002 | Addy |
| 6,593,850 B1 | 7/2003 | Addy |
| 6,603,387 B1 | 8/2003 | Addy et al. |
| 6,619,055 B1 | 9/2003 | Addy |
| 6,690,276 B1 | 2/2004 | Marino |
| 6,691,172 B1 | 2/2004 | Clow et al. |
| 6,724,316 B2 | 4/2004 | Addy et al. |
| 6,798,342 B2 | 9/2004 | Addy |
| 6,804,169 B2 | 10/2004 | Addy et al. |
| 6,868,493 B2 | 3/2005 | Orlando et al. |
| 6,928,148 B2 | 8/2005 | Simon et al. |
| 6,952,165 B2 | 10/2005 | Kovach et al. |
| 6,963,280 B2 | 11/2005 | Eskildsen |
| 6,965,313 B1 | 11/2005 | Saylor et al. |
| 6,987,450 B2 | 1/2006 | Marino et al. |
| 6,999,562 B2 | 2/2006 | Winick |
| 7,010,421 B2 | 3/2006 | Zakrewski |
| 7,081,813 B2 | 7/2006 | Winick et al. |
| 7,091,850 B2 | 8/2006 | Katz |
| 7,096,001 B2 | 8/2006 | Addy et al. |
| 7,113,090 B1 | 9/2006 | Saylor et al. |
| 7,113,099 B2 | 9/2006 | Tyroler et al. |
| 7,116,221 B2 | 10/2006 | Addy |
| 7,119,678 B2 | 10/2006 | Katz |
| 7,119,681 B2 | 10/2006 | Eskildsen |
| 7,120,795 B2 | 10/2006 | Raphael et al. |
| 7,129,831 B2 | 10/2006 | Martin et al. |
| 7,135,959 B2 | 11/2006 | Wagner et al. |
| 7,142,111 B2 | 11/2006 | Eskildsen et al. |
| 7,142,641 B2 | 11/2006 | Hinkson et al. |
| 7,145,455 B2 | 12/2006 | Eskildsen et al. |
| 7,151,461 B2 | 12/2006 | Wilson et al. |
| 7,155,485 B2 | 12/2006 | Clow et al. |
| 7,177,639 B2 | 2/2007 | Winick et al. |
| 7,183,907 B2 | 2/2007 | Simon et al. |
| 7,187,563 B1 | 3/2007 | Bobrek |
| 7,199,702 B2 | 4/2007 | Lizza |
| 7,248,161 B2 | 7/2007 | Spoltore et al. |
| 7,250,859 B2 | 7/2007 | Martin et al. |
| 7,286,049 B2 | 10/2007 | Martin |
| 7,292,142 B2 | 11/2007 | Simon et al. |
| 7,312,705 B2 | 12/2007 | Garavuso et al. |
| 7,319,392 B2 | 1/2008 | Babich et al. |
| 7,321,301 B2 | 1/2008 | Spoltore et al. |
| 7,321,788 B2 | 1/2008 | Addy et al. |
| 7,323,979 B2 | 1/2008 | Eskildsen |
| 7,330,109 B2 | 2/2008 | Martin |
| 7,356,429 B2 | 4/2008 | Eskildsen |
| 7,362,221 B2 | 4/2008 | Katz |
| 7,363,488 B2 | 4/2008 | Hinkson |
| 7,382,242 B2 | 6/2008 | Martin |
| 7,385,478 B2 | 6/2008 | Martin et al. |
| 7,394,359 B2 | 7/2008 | Eskildsen |
| 7,397,371 B2 | 7/2008 | Martin et al. |
| 7,400,242 B2 | 7/2008 | Martin |
| 7,403,109 B2 | 7/2008 | Martin |
| 7,423,530 B2 | 9/2008 | Babich et al. |
| 7,443,304 B2 | 10/2008 | Rowe et al. |
| 7,446,647 B2 | 11/2008 | Helgeson |
| 7,479,893 B2 | 1/2009 | Weston et al. |
| 7,518,506 B2 | 4/2009 | Lee et al. |
| 7,619,512 B2 | 11/2009 | Trundle et al. |
| 7,633,388 B2 | 12/2009 | Simon et al. |
| 7,636,039 B2 | 12/2009 | Babich |
| 7,642,910 B2 | 1/2010 | Eskildsen |
| 7,646,853 B2 | 1/2010 | Martin et al. |
| 7,651,530 B2 | 1/2010 | Winick |
| 7,675,407 B2 | 3/2010 | Yuk et al. |
| 7,679,503 B2 | 3/2010 | Mason et al. |
| 7,679,507 B2 | 3/2010 | Babich et al. |
| 7,680,283 B2 | 3/2010 | Eskildsen |
| 7,711,796 B2 | 5/2010 | Gutt et al. |
| 7,734,906 B2 | 6/2010 | Orlando et al. |
| 7,741,969 B2 | 6/2010 | Linford |
| 7,746,224 B2 | 6/2010 | Addy |
| 7,792,511 B2 | 9/2010 | Weston et al. |
| 7,796,035 B2 | 9/2010 | Hallbert et al. |
| 7,796,052 B2 | 9/2010 | Katz |
| 7,812,855 B2 | 10/2010 | Babich et al. |
| 7,818,573 B2 | 10/2010 | Martin et al. |
| 7,836,209 B2 | 11/2010 | Addy |
| 7,843,322 B2 | 11/2010 | Zakrewski et al. |
| 7,848,505 B2 | 12/2010 | Martin et al. |
| 7,852,200 B2 | 12/2010 | Romanczyk et al. |
| 7,853,199 B2 | 12/2010 | Blum |
| 7,853,200 B2 | 12/2010 | Blum et al. |
| 7,855,636 B2 | 12/2010 | Martin et al. |
| 7,856,047 B2 | 12/2010 | Wang et al. |
| 7,856,558 B2 | 12/2010 | Martin et al. |
| 7,902,977 B2 | 3/2011 | Howe |
| 7,916,018 B2 | 3/2011 | Eskildsen et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,941,182 B2 | 5/2011 | Ferro et al. |
| 7,961,091 B2 | 6/2011 | Edwards et al. |
| 7,978,069 B2 | 7/2011 | Wu |
| 7,992,199 B1 | 8/2011 | Winick et al. |
| 7,995,600 B2 | 8/2011 | Wontorcik et al. |
| 8,004,399 B2 | 8/2011 | Reyes et al. |
| 8,013,730 B2 | 9/2011 | Oh et al. |
| 8,022,807 B2 | 9/2011 | Martin et al. |
| 8,031,074 B2 | 10/2011 | Lizza |

(56) References Cited

U.S. PATENT DOCUMENTS

| | | |
|---|---|---|
| 8,035,516 B2 | 10/2011 | Edwards et al. |
| 8,073,931 B2 * | 12/2011 | Dawes et al. ............... 709/219 |
| 8,086,702 B2 | 12/2011 | Baum et al. |
| 8,086,703 B2 | 12/2011 | Baum et al. |
| 8,122,131 B2 | 2/2012 | Baum et al. |
| 8,125,184 B2 | 2/2012 | Raji et al. |
| 8,140,048 B2 | 3/2012 | Martin et al. |
| 8,209,400 B2 | 6/2012 | Baum et al. |
| 8,214,494 B1 | 7/2012 | Slavin |
| 8,214,496 B2 | 7/2012 | Gutt et al. |
| 8,310,365 B2 * | 11/2012 | Siegler et al. ............... 340/541 |
| 8,335,842 B2 | 12/2012 | Raji et al. |
| 8,350,694 B1 | 1/2013 | Trundle et al. |
| 8,350,697 B2 | 1/2013 | Trundle et al. |
| 8,395,494 B2 | 3/2013 | Trundle et al. |
| 8,451,986 B2 | 5/2013 | Cohn et al. |
| 8,456,293 B1 | 6/2013 | Trundle et al. |
| 8,526,909 B2 | 9/2013 | Sennett et al. |
| 2003/0158884 A1 | 8/2003 | Alford, Jr. |
| 2004/0203387 A1 | 10/2004 | Grannan |
| 2005/0128068 A1 | 6/2005 | Winick et al. |
| 2005/0216302 A1 | 9/2005 | Raji et al. |
| 2006/0230270 A1 | 10/2006 | Goffin |
| 2008/0183842 A1 | 7/2008 | Raji et al. |
| 2009/0066789 A1 | 3/2009 | Baum et al. |
| 2009/0070473 A1 | 3/2009 | Baum et al. |
| 2009/0070681 A1 | 3/2009 | Dawes et al. |
| 2009/0074184 A1 | 3/2009 | Baum et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2010/0023865 A1 | 1/2010 | Fulker et al. |
| 2010/0082744 A1 | 4/2010 | Raji et al. |
| 2010/0095369 A1 | 4/2010 | Gutt et al. |
| 2010/0153853 A1 | 6/2010 | Dawes et al. |
| 2010/0245107 A1 | 9/2010 | Fulker et al. |
| 2010/0277315 A1 * | 11/2010 | Cohn et al. ............... 340/540 |
| 2011/0029726 A1 | 2/2011 | Fujimoto |
| 2011/0102171 A1 | 5/2011 | Raji et al. |
| 2011/0128378 A1 | 6/2011 | Raji |
| 2011/0248857 A1 | 10/2011 | Rutherford et al. |
| 2012/0062026 A1 | 3/2012 | Raji et al. |
| 2012/0066608 A1 | 3/2012 | Sundermeyer et al. |
| 2012/0066632 A1 | 3/2012 | Sundermeyer et al. |
| 2012/0260184 A1 | 10/2012 | Dawes et al. |
| 2012/0278453 A1 | 11/2012 | Baum et al. |
| 2012/0278877 A1 | 11/2012 | Baum et al. |
| 2012/0324566 A1 | 12/2012 | Baum et al. |
| 2012/0331109 A1 | 12/2012 | Baum et al. |
| 2013/0062951 A1 | 3/2013 | Raji et al. |

OTHER PUBLICATIONS

International Search Report and Written Opinion dated Jan. 3, 2013 for International Application Serial No. PCT/US2012/048645, International Filing Date: Jul. 27, 2012, consisting of 12 pages.

Office Action dated Jan. 2, 2015, issued in U.S. Appl. No. 14/180,648, filed Feb. 14, 2014, consisting of 37 pages.

\* cited by examiner

SECURITY SYSTEM HAVING SEGREGATED OPERATING SOFTWARE

CROSS-REFERENCE TO RELATED APPLICATION

This application is a continuation-in-part of U.S. patent application Ser. No. 14/180,648 filed Feb. 14, 2014, entitled "SECURITY SYSTEM AND METHOD", which is a continuation of U.S. patent application Ser. No. 13/560,679, filed Jul. 27, 2012, now U.S. Pat. No. 8,665,084, issued Mar. 4, 2014, entitled "SECURITY SYSTEM AND METHOD", which claims the benefit of U.S. Provisional Patent Application Ser. No. 61/513,003, filed Jul. 29, 2011, entitled "TOTAL SITE SECURITY AND CONTROL." This Application is also related to and claims priority to U.S. Provisional Patent Application Ser. No. 61/790,675, filed Mar. 15, 2013, entitled "SECURITY SYSTEM HAVING SEGREGATED OPERATING SOFTWARE." The entire contents of all of these applications are hereby incorporated herein by reference.

STATEMENT REGARDING FEDERALLY SPONSORED RESEARCH OR DEVELOPMENT

N/A

FIELD OF THE INVENTION

The invention relates to premises-based systems that centrally control a plurality of separate devices, and in particular to security systems having segregated life safety and life style functionality within a single controller.

BACKGROUND OF THE INVENTION

The demand for systems that monitor a variety of conditions, such as monitoring homes and businesses for alarm conditions, allow users to centrally control various devices (such as thermostats, switches, cameras, appliances, etc.), monitor medical conditions, and the like continues to grow as more home and business owners seek better control over their premises and to protect it from various hazards and threats. Such threats include intrusion, fire, carbon monoxide and flooding, among others dangers, which may be monitored locally or remotely by the users, and also may be reported to a monitoring station.

Conventional security systems typically employ a control panel that receives "event" (such as triggering alarms) and other information from various sensors and devices, and are used to operate those devices. This may be done locally by the user, or remotely over a network, such as via a plain old telephone service (POTS) line, IP Broadband connections, or cellular radio. In the case of certain alarm events, a remote monitoring center may also take appropriate action, such as notifying emergency responders. Installation and servicing complexity associated with conventional security systems tends to be high as an installer typically has to physically mount a control panel onto the wall and manually configure a number of sensors. In particular, the installer has to spend lots of time manually programming and configuring the control panel and each sensor in the system, thereby slowing down the installation process and limiting the number of security systems the installer can install in a given time period. This is true as well for more recent all-in-one (AIO) security systems, in which the control panel and a user interface (such as a keypad) are combined in a single unit, and do-it-yourself (DIY) security systems.

These systems are typically limited to controlling and monitoring life safety features, such as intrusion and fire detection. In order to add life style features (such as lighting control, temperature control and remote viewing of video), an additional controller is needed, as such life style systems operate in a manner that has developed largely independent of life safety systems. These life style systems do not adhere to industry and governmental requirements that determine the specifications for, and operation of, security and other life safety systems. Life style systems provide different types of event information using different protocols, and are typically operated and managed differently than those used for monitoring life safety.

Consequently, in order to add this lifestyle capability, users have had to have separate hardware/software/service directed to controlling and monitoring these additional features. While some conventional security panels have incorporated life safety and life style systems in to the same controller, these systems similarly operate independently, e.g., using independent processing systems, to minimize the risk of the life style features interfering with the life safety operation. For example, a user viewing multiple live streams of video from various monitoring video camera around the premises might otherwise consume processing resources such that life safety operation may be interrupted due to lack of processing resources.

SUMMARY OF THE INVENTION

The invention advantageously provides a method and system for premises-based systems that centrally control a plurality of separate devices, and in particular to security systems having segregated life safety and life style software.

According to one embodiment of the invention, a control apparatus for a premises based system is provided. The control apparatus includes a memory configured to store life safety code and life style code. The control apparatus includes a processor configured to operate the life safety code and life style code. The memory and processor are configured for separate operation of the life safety and life style code for changing the operation of the life style code without changing the operation of the life safety code.

According to one embodiment of this aspect, a virtual machine is configured to provide the separate operation of the life safety code and life style code on the processor. According to another embodiment of this aspect, the memory is configured to store life safety code in a first partition in memory and store life style code in a second partition in memory different from the first partition. The processor is configured to modify at least a portion of the life style code in the first partition.

According to another embodiment of this aspect, the life style code may be stored in a first partition in memory and the life safety code may be stored in a second partition in the memory. The modification of the life style code may include receiving updated life style code, storing the updated life style code to a third partition in the memory and installing the updated life style code into a fourth partition in the memory. The modification of life style code may also include shutting down and unmounting the life style code from the first partition and mounting the installed updated life style code for operation by the processor. According to one embodiment of this aspect, the processor may be configured to determine resource usage for life style functions associated with life style code and determine whether resource usage exceeds a predefined resource threshold. If the resource usage is determined to exceed the predefined resource threshold, the processor may be configured to shut down at least one life style function.

According to one embodiment of this aspect, resource usage may include at least one of memory usage and computing resource usage. According to one embodiment of this aspect, a wireless communication element may be configured to support a plurality of wireless communication protocol radios. A premises power supply may be configured to supply power to the control apparatus. A backup power supply may be configured to provide power to the control apparatus during failure of the premises power supply. The processor may be further configured to determine if the premises power supply has failed and shut down at least one life style function and corresponding wireless communication protocol radio in response to the determined failure of the premises power supply. According to one embodiment of this aspect, a wireless communication element may be configured to support a plurality of wireless communications protocols. The wireless communication element may include a plurality of wireless communication protocol radios. The plurality of wireless communication radios include at least one life safety radio and at least one life style radio. The processor may be further configured to activate all wireless communication radios, determine an amount of interference between the at least one life style radio and at least one life safety radio and generate an alert if the amount of interference exceeds a predefined interference threshold. According to one embodiment of this aspect, at least one socket for communicating between life style code and life safety code is provided. The processor may be further configured to close down the at least one socket during the updating of life style code.

According to another embodiment of the invention, a method for a control apparatus of a premises based system is provided. Life safety code is stored in a first partition in memory. Life style code is stored in a second partition in memory different from the first partition. The operation of the life style code is caused to be changed while the operation of the life safety code remains unchanged. According to another embodiment of this aspect, the updating of the life style code may include receiving updated life style code, storing the updated life style code to a third partition in the memory and installing the updated life style code into a fourth partition in the memory. The updating of the life style code may further include shutting down and unmounting the stored life style code and mounting the installed updated life style code for operation by the processor.

According to another embodiment of this aspect, resource usage for life style functions associated with life style code is determined. A determination is made whether resource usage exceeds a predefined resource threshold. If the resource usage is determined to exceed the predefined resource threshold, at least one life style function is shut down. According to another embodiment of this aspect, resource usage may include at least one of memory usage and computing resource usage. According to another embodiment of this aspect, the control apparatus may include a wireless communication element configured to support a plurality of wireless communication protocol radios, a premises power supply configured to supply power to the control apparatus and a backup power supply configured to provide power to the control apparatus during failure of the premises power supply. A determination is made if the premises power supply has failed. At least one life style function and corresponding wireless communication protocol radio is shut down in response to the determined failure of the premises power supply.

According to one embodiment of this aspect, the control apparatus may include a wireless communication element having at least one life safety radio and at least one life style radio. At least one life safety radio and at least one life style radio are activated. An amount of interference between the at least one life style radio and at least one life safety radio is determined. An alert is generated if the amount of interference exceeds a predefined interference threshold. According to one embodiment of this aspect, the control apparatus may include at least socket for communicating between life style code and life safety code. The updating of life style code may include closing down the at least one socket.

According to another embodiment of the invention, a system is provided. A remote server may be configured to store updated life style code configured to support life style features. A premises based control apparatus may include a remote communication element configured to receive at least a portion of the updated life style code from the remote server, a memory configured to store life safety code and life style code and a processor configured to operate the life safety code and life style code. The memory and processor are configured for separate operation of the life safety and life style code for changing the operation of the life style code based at least in part on the received updated life style code without changing the operation of the life safety code.

According to one embodiment of this aspect, the life style code may be stored in a first partition in memory and the life safety code may be stored in a second partition in the memory. The changing based at least in part on the updated life style code may include storing the updated life style code to a third partition in the memory, installing the updated life style code into a fourth partition in the memory, shutting down and unmounting the life style code from the first partition and mounting the installed updated life style code for operation by the processor.

According to one embodiment of this aspect, the processor may be further configured to determine resource usage for life style functionality associate with life style code. The resource usage may include at least one of memory usage and computing resource usage. The processor may be further configured to determine whether resource usage exceeds a predefined resource threshold and if the resource usage is determined to exceed the predefined resource threshold, shut down at least one life style function.

According to one embodiment of this aspect, the control apparatus may further comprise at least one socket for communicating between life style code and life safety code. The processor may be further configured to close down the at least one socket during the updating of life style code. According to one embodiment of this aspect, the control apparatus may further comprise a wireless communication element support a plurality of wireless communications protocols. The wireless communication element may include a plurality of wireless communication protocol radios. The plurality of wireless communication radios may include at least one life safety radio and at least one life style radio. The processor may be further configured to activate all wireless communication radios, determine an amount of interference between the at least one life style radio and at least one life safety radio and generate an alert if the amount of interference exceeds a predefined interference threshold.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
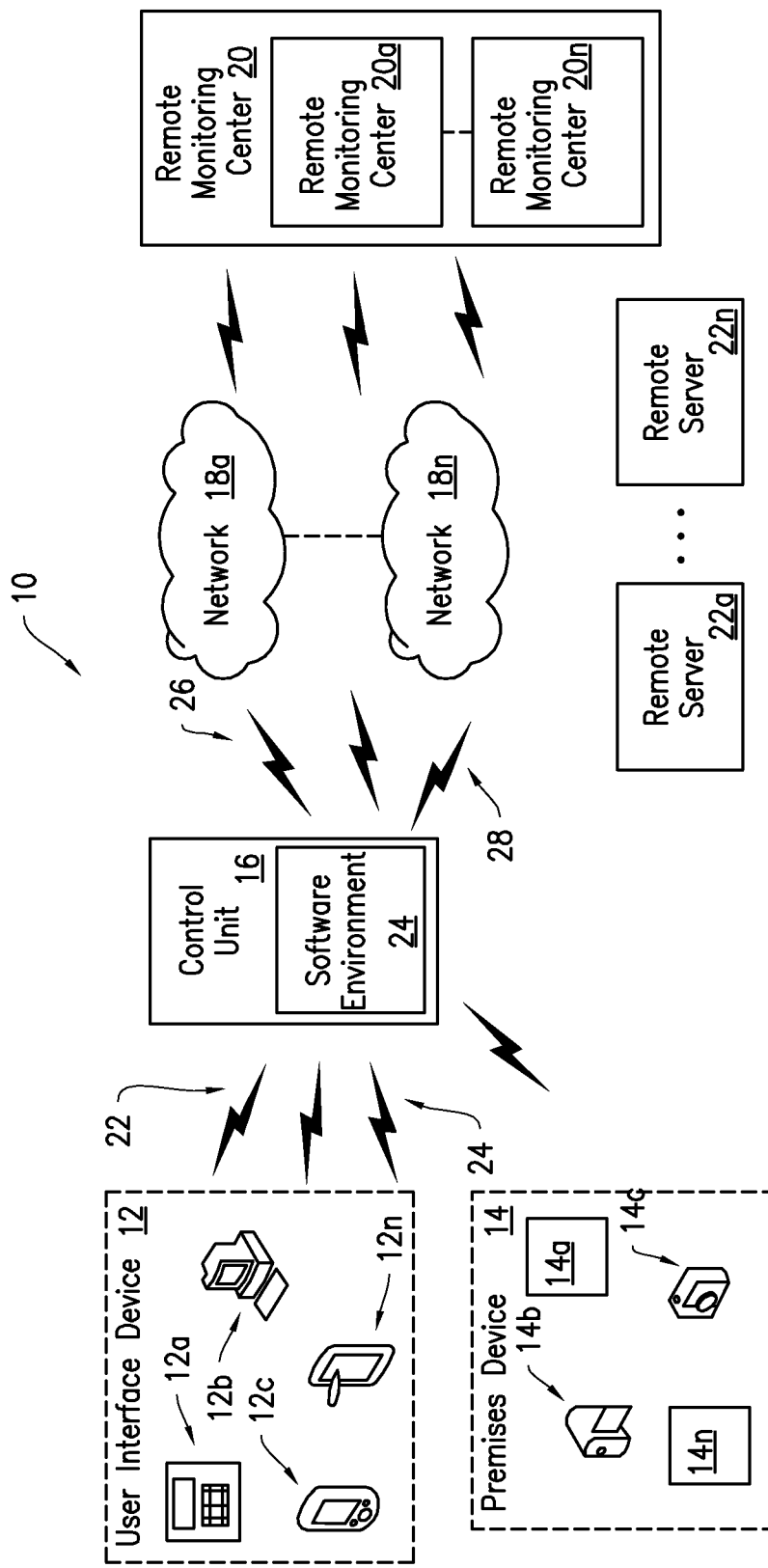
FIG. 1 is a block diagram of a premises based control system having segregated life safety and life style software, constructed in accordance with the principles of the invention.

The invention advantageously provides an apparatus and method for a premises-based system operating system, and components thereof have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein. While the invention is described herein with respect to a security system, the invention is not limited to such. It is contemplated that the processes and functions described herein may be applied to any premises based system that centrally controls a plurality of separate devices.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 a control system constructed in accordance with the principles of the invention and designated generally as "10." System 10 may include one or more user interface devices 12a to 12n (collectively referred to as "user interface device 12"), one or more premises devices 14a to 14n (collectively referred to as "premises device 14"), control unit 16, one or more networks 18a to 18n (collectively referred to as "network 18"), one or more remote monitoring centers 20a to 20n (collectively referred to as "remote monitoring center 20") and one or more remote servers 22a to 22n (collectively referred to as "remote server 22"), communicating with each other.

User interface device 12 may be a wireless device that allows a user to communicate with control unit 16. User interface device 12 may be a portable control keypad/interface 12a, computer 12b, mobile phone 12c and tablet 12n, among other devices that allow a user to interface with control unit 16. User interface device 12 may communicate at least with control unit 16 using one or more wireless communication protocols well known to those of ordinary skill in the art. For example, portable control keypad 12a may communicate with control unit 16 via a ZigBee based communication link 22, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. Other communication protocols may be used and may be directional or bi-directional and proprietary and not per any published standard. The invention is not limited in this regard. User interface device 12 is discussed in detail with respect to FIG. 3.

Premises devices 14 may include one or more types of sensors, control and/or image capture devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control unit 16 via proprietary wireless communication protocols and may also use Wi-Fi, both of which are known in the art. Those of ordinary skill in the art will also appreciate that various additional sensors and control and/or image capture devices may relate to life safety or life style depending on both what the sensors, control and image capture devices do and how these sensors, control and image devices are used by system 10. One of the advantages of the invention is the ability to use any of these devices irrespective of whether they are life safety or life style.

Control unit 16 may provide management functions such as power management, premises device management and alarm management, among other functions. In particular, control unit 16 is configured such that it utilizes a software architecture having separate life style and life safety software code, and the life style software running on control unit 16 does not impact life safety software code also running on control unit 16. Control unit 16 may include Software environment 24, as described in detail with respect to FIGS. 4 and 5, to help achieve this.

Control unit 16 may manage one or more life safety and life style features using this segregated software architecture. Life safety features may correspond, for example, to security system functions and settings associated with premises conditions that may result in life threatening harm to a person such as detecting a perimeter intrusion, carbon monoxide detection and intrusion detection. Life style features may correspond, for example, to non-security system functions and settings associated with video capturing devices and other non-life threatening conditions of the premises such as lighting and thermostat functions. Example control unit 16 components and functions are described detail with respect to FIG. 2.

Control unit 16 may communicate with network 18 via one or more communication links. In particular, the communications links may be broadband communication links such as a wired cable modem or Ethernet communication link 26, and digital cellular communication link 28, e.g., long term evolution (LTE) based link, among other broadband communication links known in the art. Broadband as used herein may refer to a communication link other than a plain old telephone service (POTS) line such as other wired and/or wireless communication links including Wi-Fi and other technologies. Ethernet communication link 26 may be an IEEE 802.3 based communication link. Network 18 may be a wide area network, local area network, wireless local network and metropolitan area network, among other networks known in the art. Network 18 provides communications between control unit 16, remote monitoring center 20 and remote server 22, among other servers and devices.

System 10 may include remote monitoring center 20 that is capable of performing certain monitoring, configuration and/or control functions associated with control unit 16. For example, remote monitoring center 20 may include a remote life safety monitoring center that monitors life safety features associated with control unit 16 in which the remote monitoring center 20 receives life safety data from control unit 16. For example, with respect to fire and carbon monoxide detectors/sensors, life safety data may include at least one carbon monoxide readings, smoke detection reading, sensor location and time of reading, among other related to these detectors that may be communicated with remote monitoring center 20. In yet another example, with respect to a door contact detector, life safety data may include at least one of sensor location and time of detection, among other data related to the door contact detection that may be communicated with remote monitoring center 20.

Alarm event data from the premises may be used by the remote monitoring center in running through various life safety response processes in notifying the owner of the premises, determining whether an actual alarm event is occurring at the premises, and notifying any appropriate response agency (e.g., police, fire, emergency response, other interested parties such as premises owners, etc.).

The same or separate remote monitoring center 20 may also include a life style system/service that allows for various life style features associated with security control 16. The remote life style system may receive life style data from control unit 16. For example, with respect to temperature control, life safety data may include thermostat readings. In yet another example, with respect to video capture devices, life style data may include at least one of captured images, video, time of video capture and video location, among other data related to video capture devices that may be communicate with remote monitoring center 20. Remote monitoring center 20 may also provide updates to control unit 16 such as updates to features associated with life safety and/or life style operating system. Those of ordinary skill in the art will appreciate that video and other data may also be used by the life safety monitoring center. System 10 may include remote server 22 may contain a database that stores system data such as alarm events, system configuration, etc. Remote server 22 may provide updates to control unit 16. For example, remote server 22 may provide updated life style software 68 such as life style code 78 and/or life style data 80 to control unit 16, as described in detail with respect to FIG. 11. Remote server 22, of course, may be co-located with and/or form part of remote monitoring center 20.

Figure 2:
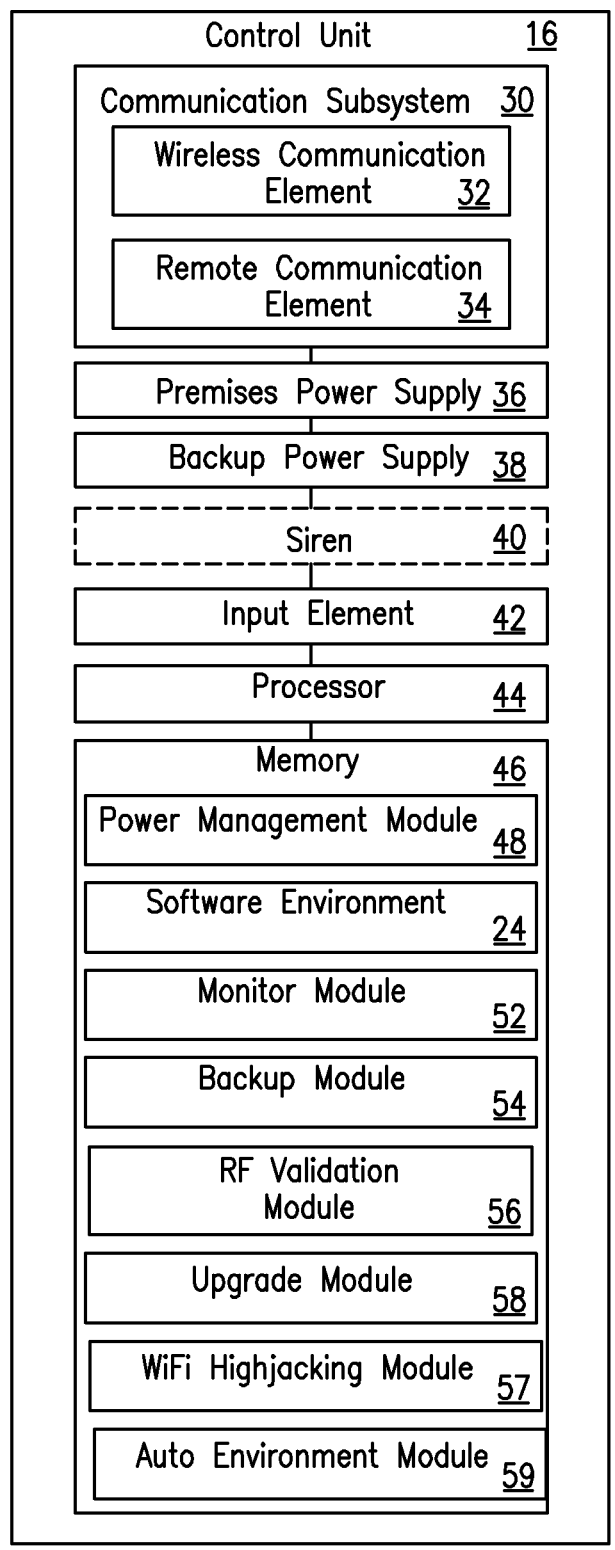
FIG. 2 is a block diagram of a control unit constructed in accordance with the principles of the invention.

An example control unit 16 for managing a premises security system is described with reference to FIG. 2. Control unit 16 may include communication subsystem 30 that is configured to provide communications with user interface device 12, premises device 14 and network 18. These communications may be provided by communication subsystem 30 via one or more different paths. In particular, communication subsystem 30 may include wireless communication element 32 and remote communication element 34. Wireless communication element 32 provides wireless communication with user interface device 12 and premises device 14. Wireless communication element 32 may support one or more wireless communication protocols such as ZigBee, Z-wave and Wi-Fi, e.g., IEEE 802.11, among others wireless communications protocols that support wireless data transfer.

Wireless communication element 32 may be composed of one or more hardware components in which each hardware component is configured to provide wireless communication using a specific protocol. For example, wireless communication element 32 may include a ZigBee hardware component configured to provide ZigBee based communications and a Z-wave hardware component configured to provide Z-wave based communications. Wireless communication element 32 may provide other wireless communication protocols. The hardware components associated with wireless communication element 32 may be internal components within control unit 16 such that these features are built-in or standard features. Alternatively, any one or more of the hardware components associated with wireless communication element 32 may be external components that may be replaced by a user, homeowner or installer. For example, the ZigBee and Z-wave hardware component modules may be internal components while the Wi-Fi hardware component may be an external component that allows for upgrading and/or an internal component. Wireless communication element 32 may broadcast a wireless signal so that user interface device 12 may connect directly to control unit 16. For example, wireless communication element 32 may provide a Wi-Fi encrypted service set identifier (SSID) and path for communication with multiple user interface devices 12.

By supporting a plurality of wireless communication protocols, wireless communication element 32 enables control unit 16 to be used with a variety of user interface devices 12 and premises devices 12 that are designed to work using only a specific wireless communication protocol. Supporting a plurality of wireless communication protocols allows easy upgrading of existing user interface device 12 and premises device 14, and for control unit 16 integration with various equipment venders that may incorporate different wireless protocols. Wireless communication element 32 may provide two-way voice communication with user interface device 12, which is then communicated with remote monitoring center 20. For example, wireless communication element 32 may support voice over internet protocol (VoIP) based communications. In one embodiment, component parts of wireless communication element 32, e.g., an IEEE 802.11 communication module, may also be past of remote communication element so that the wireless communication protocols, e.g., IEEE 802.11 protocols, can be used to communicate with remote monitoring center 20. In other words, one or more specific communication modules of wireless communication element 32 can also be part of remote communication element 34.

Remote communication element 34 is configured to provide broadband communications with remote monitoring center 20 and/or remote server 22 via one or more networks 18. For example, remote communication element 34 may be an Ethernet based hardware component that provides communication with network 18. Alternatively or in addition to Ethernet based hardware component, remote communication element 34 may include a Wi-Fi (IEEE 802.11) hardware component that provides communication with a home or other premises network, e.g., a home wireless network, and may utilize some of the same components as wireless communication element 32. The remote communication element 34 may also include a cellular radio hardware component that provides communications with at least one cellular network such as an LTE based cellular network. Control unit 16 may use Ethernet communication link 26 as a primary communication link such that the cellular communication link is used for broadband communications when the Ethernet or primary communication link is not functioning properly such as during a power outage where a home network is unavailable, i.e., home network router has no power. In one example, remote communication element 34 may receive at least a portion of updated life style code form remote server 22.

Control unit 16 may include premises power supply 36 that is configured to provide power to control unit 16. For example, premises power supply 36 may provide power to control unit 16 via a home alternating current (AC) power outlet or other power outlets that are known in the art. Premises power supply 36 may be a primary power supply such that control unit 16 operates using power from the premises power supply 36 when available. Control unit 16 may also include back-up power supply 38 that provides power during premises power supply failure. Back-up power supply 38 may include one or more disposable or rechargeable batteries that are configured to provide enough power to operate control unit 16 for first predetermined amount of time and activate siren 40 for a second predetermined amount of time, e.g., a user can access the security system for at least twenty-four hours while control unit 16 is power by back-up power supply 38 while the siren can be activated and operate after the twenty-four hour period.

Siren 40 may be an eighty-five decibel (dB) siren, among other audible devices known in the art. Siren 40 may be an optional component in control unit 16 such that audible alerts are generated by user interface device 12, e.g., portable control keypad/interface 12a, and not control unit 16. Moreover, control unit 16 may include at least one universal serial bus port (USB) to receive power from a laptop or other device with a USB interface. Other port types capable of providing power to control unit 16 may be used based on design need.

Input element 42 may be configured to receive input data from a user. For example, input element 42 may be a ten number keypad that enables a user to arm and disarm system 10. Input element 42 allows for an alternative or back-up way of arming and disarming system when no user interface device 12 is available to a user. Other input elements may be used as are known in the art. Control unit 16 may include one or more indicators such as light emitting diodes (LEDs) that may indicate the status of control unit 16. For example, a first LED is turned on when security control panel is powered, a second LED is turned on when the system is armed or disarmed, a third LED is turned on when an internet protocol connection is connected, a fourth LED may be turned on when the cellular connection has sufficient strength and the first LED may flash during low power conditions, among other LED and LED on/off may be used based on design need. Processor 44 may be a central processing unit (CPU) that executes computer program instructions stored in memory 46 to perform the functions described herein. Processor 44 may be configured to operate the life safety code and life style code, discussed below with respect to FIGS. 4 and 5.

Memory 46 may include non-volatile and volatile memory. For example, non-volatile memory may include a hard drive, memory stick, flash memory and the like. Also, volatile memory may include random access memory and others known in the art. Memory 46 may store one or more of power management module 48, software environment 24, monitor module 52, backup module 54, RF validation module 56 and upgrade module 58, among other data and/or modules. Power management module 48 includes instructions, which when executed by processor 44, causes processor 44 to perform the process described herein, such as the power management process, discussed in detail with reference to FIG. 6.

Figure 4:
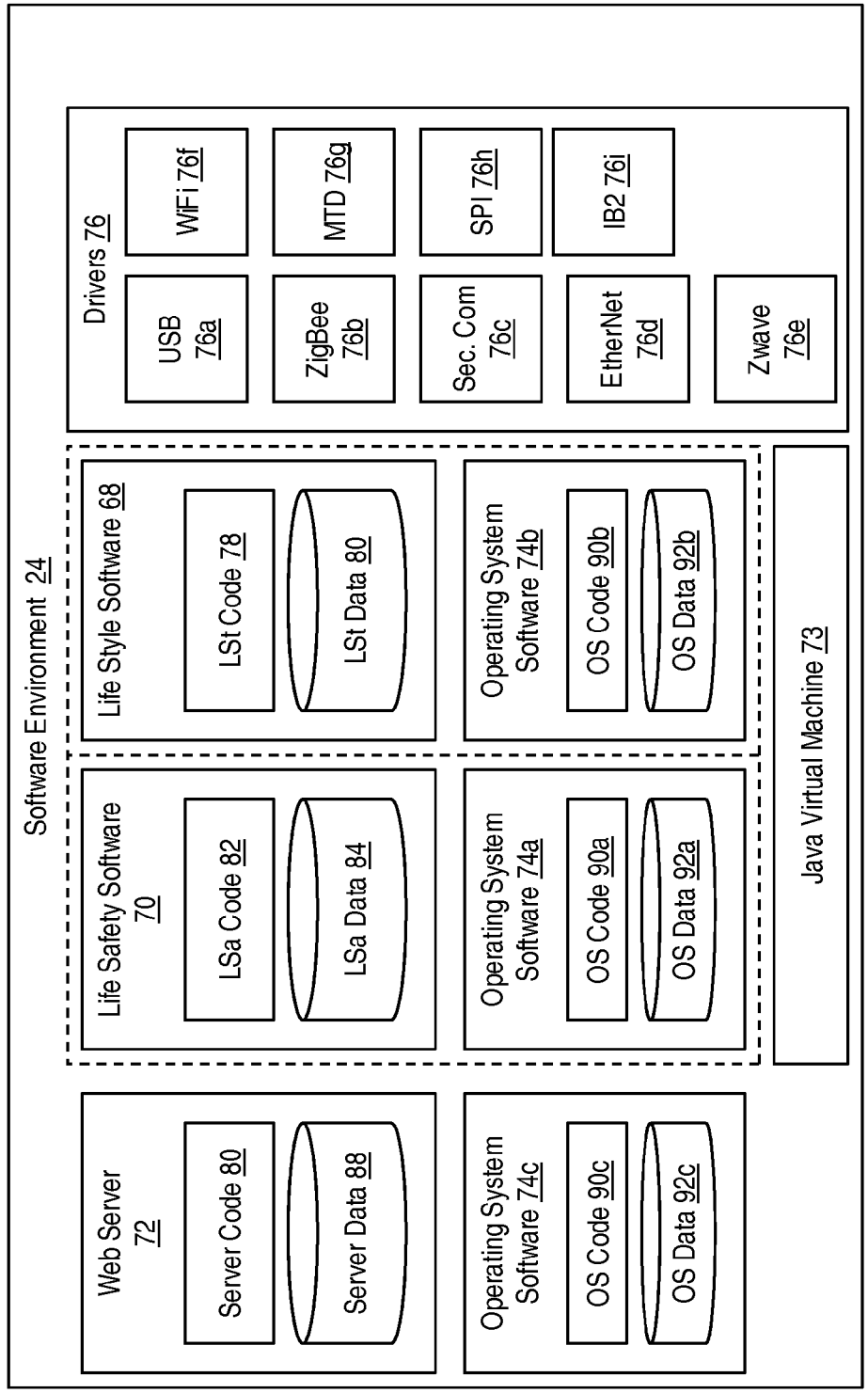
FIG. 4 is a block diagram of a software architecture of the control unit, constructed in accordance with the principles of the invention.
Figure 5:
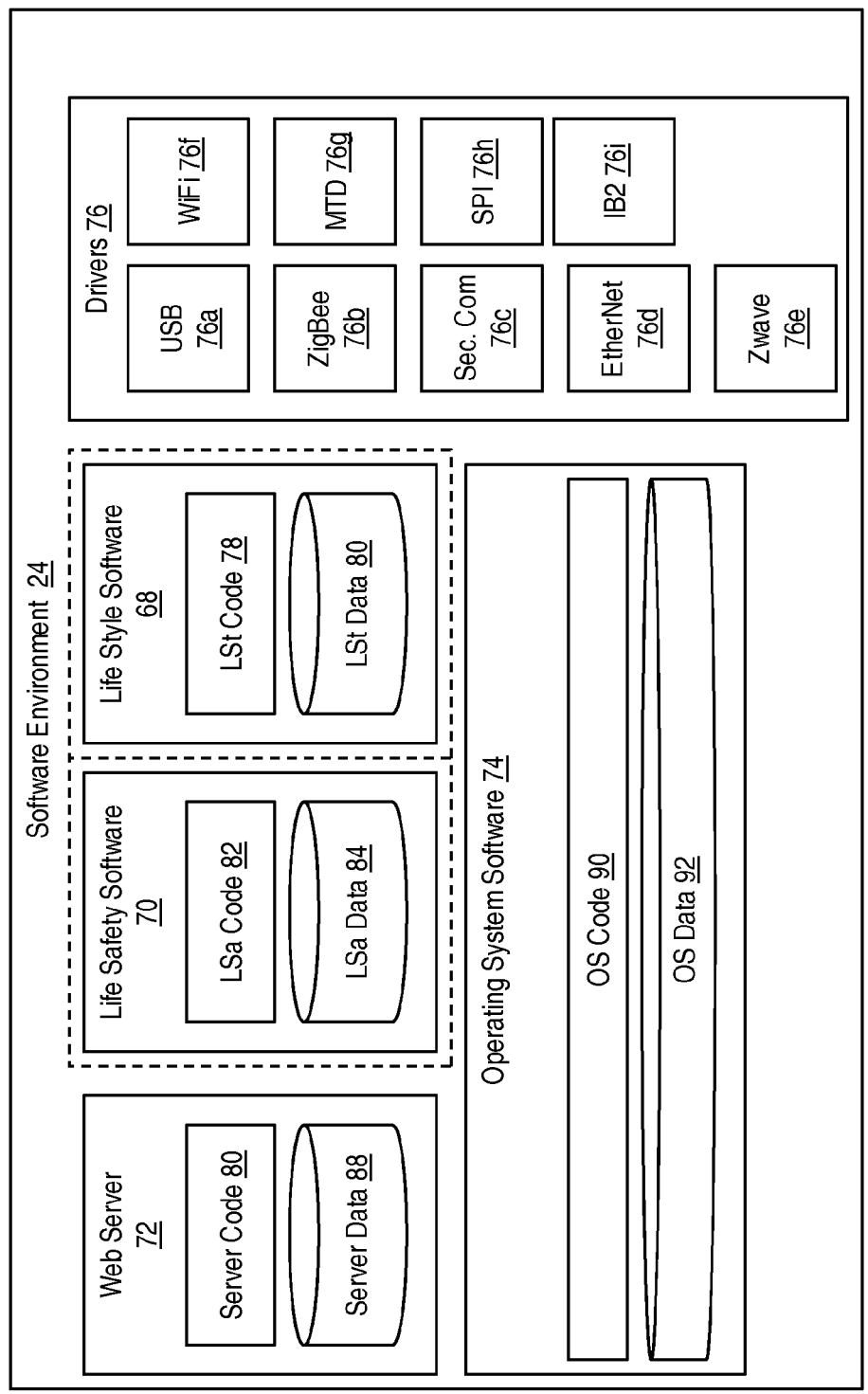
FIG. 5 is a block diagram of another software architecture of the control unit, constructed in accordance with the principles of the present invention.

Software environment 24 provides the software and memory architecture for control unit 16 functionality that helps prevent life style functionality from interfering with life safety functionality, as further described in detail with respect to FIGS. 4 and 5, i.e., memory 46 is configured to store life safety code and life style code. The memory and processor may be configured for separate operation of the life safety and life style code for changing the operation of the life style code without changing the operation of the life safety code, as described herein.

Figure 8:
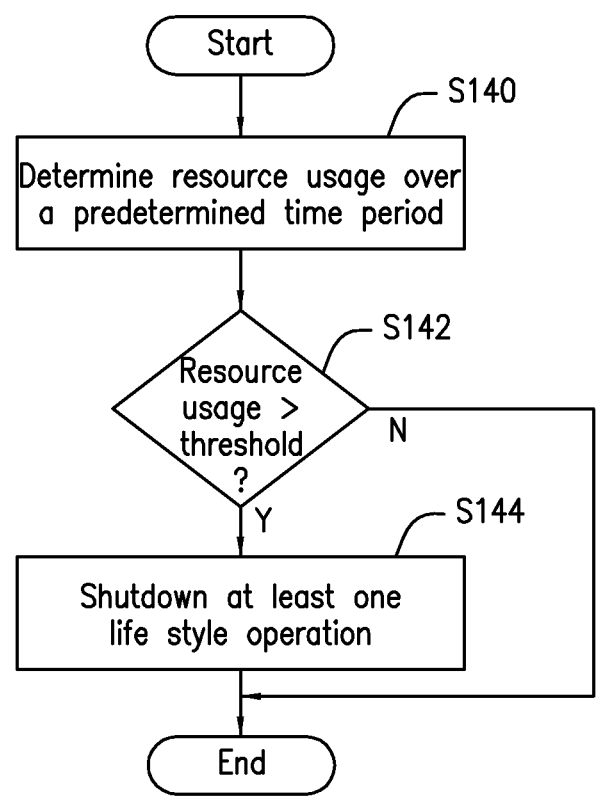
FIG. 8 is a flow chart of an example monitoring process of the invention in accordance with the principles of the invention.

Monitor module 52 includes instructions, which when executed by processor 44, causes processor 44 to perform the processes described herein, such as the resource monitoring process, discussed in detail with reference to FIG. 8. Backup module 54 includes instructions, which when executed by processor 44, cause processor 44 to perform the process described herein, such as the software code shutdown process, discussed in detail with reference to FIG. 9.

Figure 10:
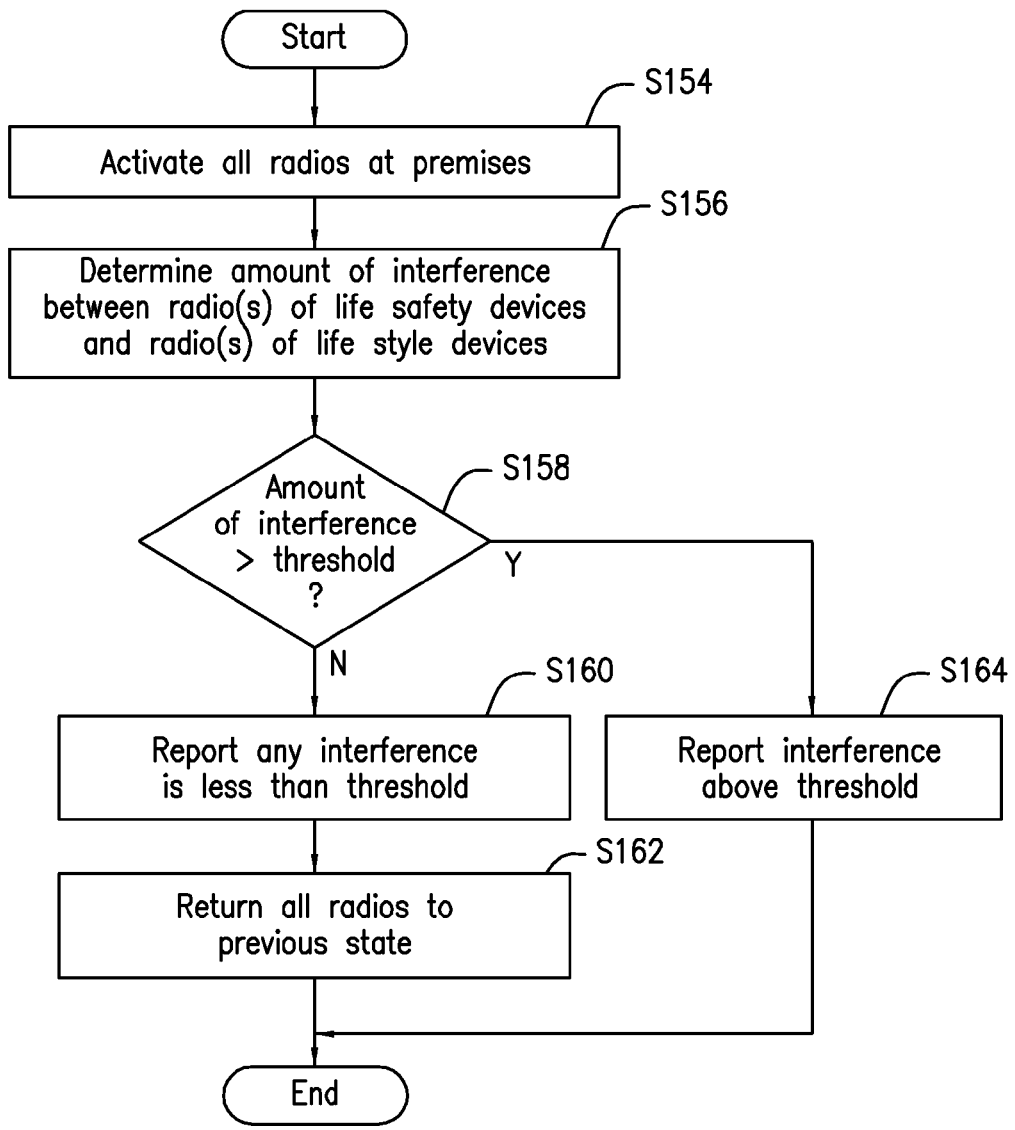
FIG. 10 is a flow chart of an example radio frequency (RF) validation process in accordance with the principles of the invention.

RF validation module 56 includes instructions, which when executed by processor 44, causes processor 44 to perform the process described herein, such as the RF validation process, discussed in detail with respect to FIG. 10. Upgrade module 58 includes instructions, which when executed by processor 44, cause processor 44 to perform the process described herein, such as the upgrading process, discussed in detail with respect to FIG. 11.

Memory 46 may also include a Wi-Fi high-jacking module 57 that varies control unit 16 settings when processor determines an unauthorized device has connected to control unit 16 via Wi-Fi. For example, Wi-Fi high-jacking module 57 may shutdown Wi-Fi and/or move to low power RF such that user interface device 12 and/or premises device 14 can still communicate with security control panel. Memory 46 may include an auto enrollment module 62 that is configured to cause processor 44 to search, wirelessly, for user interface device 12 and premises device 14 located within or near the premises. Auto enrollment module 59 may cause processor 44 to forward information associated with the found devices 12 and 14 to remote monitoring center 20 such that remote monitoring center 20 may push enrollment data to control unit 16 to facilitate configuration. Control unit 16 may use the enrollment data configured the security system such that the system operates using the found devices 12 and/14. Auto enrollment module 59 reduces installation time as the devices 12 and/14 are automatically found and enrolled for use by control unit 16.

Figure 3:
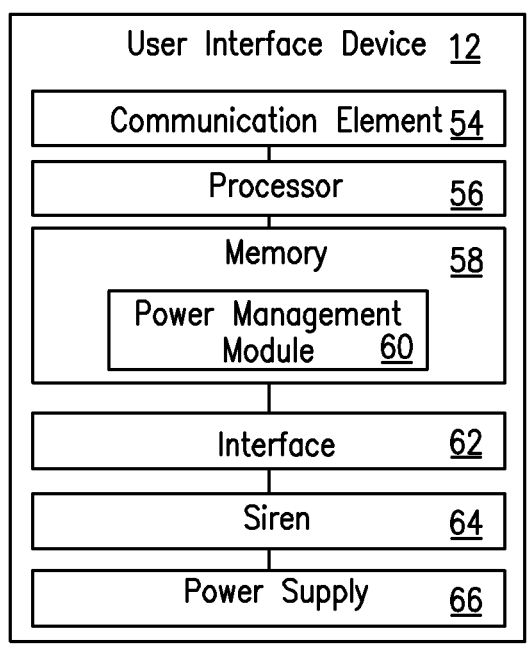
FIG. 3 is a block diagram of a user interface device constructed in accordance with the principles of the invention.

An example user interface device 12 for providing local control and configuration data is described with reference to FIG. 3. User interface device 12 may include a portable control keypad/interface 12a, personal computer 12b, mobile device 12c and tablet computer 12n, among other devices.

User interface device 12 includes communication element 54 that is configured to communicate with control unit 16 via at least one wireless communication protocol such as ZigBee, Z-wave and Wi-Fi, among other protocols known in the art. User interface device 12 may include processor 56 and memory 58 that correspond to control unit 16 components, with size and performance being adjusted based on design need. Processor 56 performs the functions described herein with respect to user interface device 12.

Figure 7:
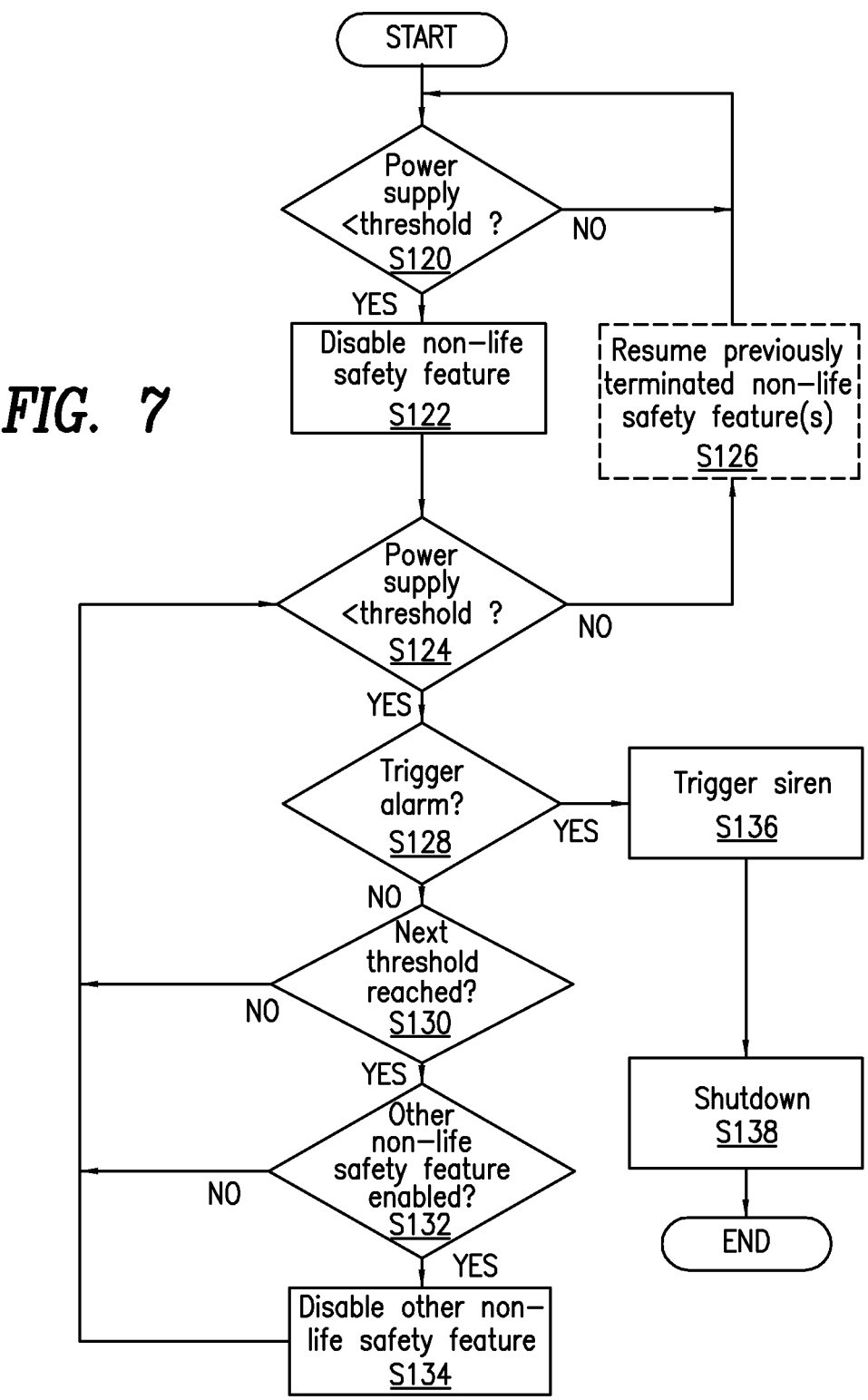
FIG. 7 is a flow chart of an example user interface device power management process of the invention, constructed in accordance with the principles of the invention.

Memory 58 may include power management module 60 in which power management module 60 includes instructions, which when executed by processor 56, causes processor 56 to perform the process described herein, such as the power management process, discussed with respect to FIG. 7. Memory 58 may store other modules and data based on design need. Interface 62 may be user interface configured to receive user inputs. For example, interface 62 may receive local control and configuration data input from user.

User interface device 12 may include siren 64 such as an eighty-five dB siren or other audible device(s) known in the art. User interface device 12 may include power supply 66 for supplying power to user interface device 12. Power supply 66 may include one or more rechargeable and/or disposable batteries, among other types of batteries that are well known in the art. Moreover, user interface device 12 may be powered via a universal serial bus (USB), have an interface that allows the connection of an external power adapter/recharger, and/or other connection type.

Example software environment 24 of control unit 16 is described with reference to FIG. 4. Software environment 24 may include life style software 68, life safety software 70, web server software 72, java virtual machine (JVM) 73, operating system software 74 and drivers 76, among other software, modules and/or drivers. In particular, life style software provides life style functionality as described herein. Life style software may include life style (LSt) code 78 and life style (LSt) data 80, among other code and data. For example, life style code may relate to non-life safety functionality including connecting to remote server to allow web and mobile based clients, controlling in-home appliances via ZWave devices, Wi-Fi based cameras for remote and local viewing and performing automations based on event triggers, among other functionality. Of note, although FIG. 4 and the description herein refer to JVM, the invention is not limited to such. It is contemplated that any virtual machine manager can be used to implement the functions attributed herein to JVM 73. In other words, JVM 73 is only one potential embodiment of a virtual machine manager.

Life safety software 70 provides life safety functionality as described herein. Life safety software 70 may include life safety (LSa) code 82 and life safety (LSa) data 84, among other code and data. For example, life safety code relates to the processing of sensor events, arm state, alarm reporting and keypad interactions, among other functionality. Both life safety software 70 and life style software 68 may run on the same hardware in control unit 16. Life safety code 82 and life style code 78 may operate on the same processor, i.e., processor 44, using a common resource pool. The primary resources utilized may include RAM memory, Flash memory and CPU cycles. Life safety software 70 and life style software 68 are segregated, but may run on a single processing device, e.g., they may be multi-threaded, thereby providing independence, but also ease of installation, service and upgradability. As used herein, "single processing device" refers to a single physical die as opposed to a single computing core. In other words, it is contemplated that the single physical semiconductor die can include multiple processing cores as one example of processor 44.

Website server software 72 provides website server functionality, and may include server code 86 and server data 88, among other code and data. JVM 73 provides a virtual machine configuration that may be used to allow a single processor such as processor 44 to separately run the life safety software 70 and life style software 68. In particular, a virtual machine such as a Java virtual machine, runs a life safety operating system layer executing life safety application code separate from another life style operating system layer executing life style application code. In such an embodiment, the virtual machine configuration allows a single processor such as processor 44 to separately run the life safety software 70 while updating life style software 68 without negatively affecting features associated with life safety software 70, i.e., life safety features remain functioning while life style features are updated. The converse is also supported. Life style code, i.e., operation, may also be shut down to conserver power and/or for other reasons without impacting life safety operation.

One or more operating system (OS) software 74a to 74c (hereinafter referred to as operating system 74) may also be used to provide an operating system environment for control unit 16. Each operating system software 74 may include respective OS code 90, i.e., 90a-90c, and OS data 92, i.e., 92a-92c, among other code and data. Drivers 76 are software drivers for one or more components and/or functions of control unit 16. Drivers 76 allow software 68, 70, 72 and/or 74 to operate one or more components of control unit 16. Drivers 76 may include Universal Serial Bus (USB) driver 76a, ZigBee driver 76b, section communication 1 driver 76c, EtherNet driver 76d, Z-wave driver 76e, WiFi driver 76f, memory technology device (MTD) driver 76g, serial peripheral interface (SPI) driver 76h and IB2 driver 76i, among other drivers. In one example, life safety code may be stored in a first partition in memory 46 and life style code may be stored in a second partition in memory 46 different from the first partition such that processor 44 may be configured to modify at least a portion of the life style code in the first partition. Memory 46 and processor 44 are configured for separate operation of the life safety code 82 and life style code 78 for changing the operation of the life style code 78 without changing the operation of the life safety code 82.

Another example software environment 24 of control unit 16 is described with reference to FIG. 5. Life style software 68, life safety software 70, web server 72 and drivers 76 substantially correspond to like software components described with respect to FIG. 4. However, the software configuration of FIG. 5 may not use JVM 73 or a virtual machine manager while still allowing a change to the life style code without changing the operation of the life safety code. The software environment 24 of FIG. 5 is configured to run code using a single OS layer but partitions the code in memory 46 such that operation of life style code 78 can be changed, e.g., updated, without changing the operation of life safety code 82, i.e., without interrupting the code or needing to update. Life safety code 82 may be stored in a first partition in memory 46 and life style code 78 may be stored in a second partition in memory 46 different from the first partition, thereby allowing processor 44 to cause the operation of the life style code to be changed while the operation of the life safety code remains unchanged, as described herein.

Figure 6:
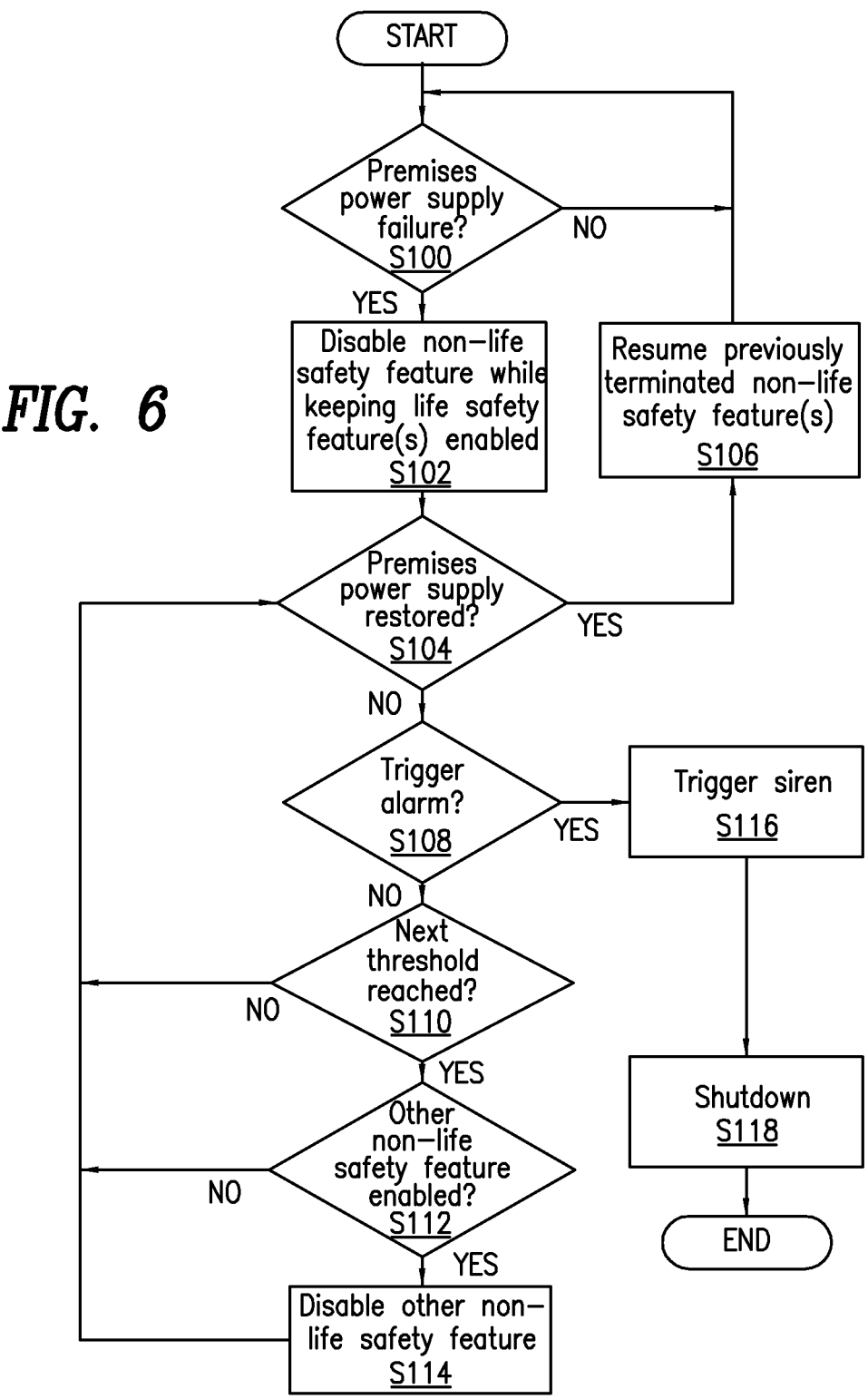
FIG. 6 is a flow chart of an example control unit power management process of the invention, constructed in accordance with the principles of the invention.

An example power management process is illustrated in FIG. 6. The power management process relates to managing a security system based at least in part on the monitoring of premises power supply 36 and back-up power supply 38.

Processor 44 determines whether premises power supply 36 has failed (Block S100). For example, processor 44 may monitor the power being provided by premises power supply 36 using well known methods in the art to determine whether power failure has occurred. Power failure may occur when the voltage being supplied by premises power supply 36 falls below a predefined voltage threshold. If processor 44 determines a power failure has not occurred, the determination of Block S100 may be repeated.

If the determination is made that premises power supply 36 is in a power failure condition, processor 44 disables a non-life safety feature such as a life style feature, while keeping the life safety feature(s) enabled (Block S102). For example, the temperature control feature associated with the life style operating system may be disabled while keeping the intrusion detection, fire detection and carbon monoxide detection features associated with life safety operating system 50 enabled. Power management module 48 advantageously allows non-life safety features such as life style features associated with life style operating system 50 to be disabled without interrupting life safety features associated with life safety operating system 52. This configuration helps ensure life safety features will remain enabled during premises power supply 36 failure while at the same time reducing power consumed by disabling a non-life safety feature. For example, some life style features may require or attempt to initiate communication with user interface device 12 and/or remote monitoring center 20 in which such communications consume power, i.e., may consume limited back-up power. Other non-life safety features that may be disabled include turning off any security control device LEDs and/or terminating communications to user interface device 12 while maintaining communications with premises devices. Therefore, disabling at least one non-life safety feature reduces the amount of power consumed by control unit 16 in which the more non-life safety features that are disabled, the greater the power savings.

Processor 44 determines whether premises power supply 36 has been restored based at least in part on the monitoring of premises power supply 36 (Block S104). For example, processor 44 may continually or periodically monitor the power level of premises power supply 36 to determine whether the power level is equal to or above the predetermined voltage threshold. If processor 44 determines premises power supply 36 has been restored, processor 44 may resume or enable the previously disabled non-life safety feature(s) (Block S106). In other words, the power management process enables non-life safety features such as life style features that may consume more power once security control device 16 is being power by premises power supply 36 such that the non-life safety features consume minimal power from the back-up power supply 38.

If the determination is made that power of premises power supply 36 has not been restored, a determination is made whether to trigger an alarm such as an audible alarm (Block S108). In particular, an audible alarm may be trigger after processor 44 determines control unit 16 has been operating on back-up power supply 38 for a predetermined amount of time, e.g., twenty-four hours. The predetermined amount of time may be based on design need and/or regulatory requirements. If the determination is made to trigger an alarm, siren 40 or siren 64 may be triggered for a predetermined amount of time (Block S116). In one embodiment, processor 44 uses communication subsystem 30 to send a siren trigger message to user interface device 12 to trigger siren 64 in user interface device 12. For example, siren 64 may be triggered for at least four minutes in order to alert a user of a control unit 16 status such as loss of all power. The predetermined amount of time the alarm is triggered may be based on design need and/or regulatory requirements. Other criteria may be used to trigger an audible alarm based on design need. After triggering siren 64, control unit 16 may shut down (Block S118). For example, control unit 16 may perform a graceful shutdown according to a shutdown routine when the back-up power supply 38 reaches a predefined threshold such as ten percent power remaining.

Referring back to Block S108, if processor 44 makes the determination not to trigger an alarm, processor 44 determines whether an available power threshold has been reached (Block S110). The power threshold may correspond to a back-up power supply 38 level at which another non-life safety feature may be shutdown in order to reduce power consumption. For example, a different non-life safety feature may be terminated every time the power level falls by a predetermined amount such as five or ten percent or to a predetermined level. Moreover, one or more non-life safety features may be terminated at a time. If the determination is made that the feature threshold is not reached, the determination of Block S104 may be repeated.

If the determination is made that the power threshold has been reached, processor 44 determines whether at least one other non-life safety feature, e.g., life style feature, is enabled (Block S112). For example, a lighting life style feature may have been previously been disabled in Block S102 but a temperature life style feature remains enabled. If the determination is made that at least one other non-life safety feature is not enabled, the determination of Block S104 may be repeated. If processor 44 determines at least one other non-life safety feature is enabled, processor 44 disables the at least one other non-life safety feature such that the non-life safety features consume less power from the back-up power supply 38 (Block S114). The order of which non-life safety features are disabled may vary based on design need and power consumption of individual features or other criteria. After disabling the at least one other non-life safety feature, the determination of Block S104 may be repeated. The power management process helps ensure more important or safety-dependent features stay powered by terminating or disabling less important features such as life style features. Alternatively, processor 44 may disable more than one or all non-life safety features at one time.

An example power management process for user interface device 12 is illustrated in FIG. 7. The power management process relates to managing user interface device 12 features based at least in part on the monitoring of power supply 66. For example, processor 56 may monitor the power being provided by power supply 66 using well known methods in the art. Processor 56 determines whether the power being supplied by power supply 66 drops below a predefined threshold based at least in part on the monitoring, i.e., whether a power supply 66 voltage or power level is less than a threshold (Block S120). The threshold may be a power and/or voltage level determined based on design need and/or other factors. If processor 56 determines power supply 66 is not below, i.e., greater than or equal to, a predetermined threshold, the determination of Block S120 may be repeated.

If the determination is made that the power supply 66 is below the predetermined threshold, processor 56 disables at least one non-safety feature while keeping life safety feature(s) enabled at user interface device 12 (Block S122). For example, processor 56 may disable a life style feature such that less power may be consumed by not having to perform processing, communication and/or other functions associated with the disabled feature. Other non-life safety features may include a backlight keypad and/or display feature. Therefore, disabling at least one non-life safety feature reduces the amount of power consumed by user interface device 12 such that the more non-safety features that are disabled, the greater the power savings.

After at least one non-life safety has been disabled, processor 56 may determine whether power supply 66 is still below the threshold based at least in part on the monitoring (Block S124). For example, processor 56 may continually or periodically monitor the voltage level of power supply 66. If the determination is made that power supply 66 is not below the threshold (i.e., is greater than or equal to the threshold), processor 56 may resume the previously disabled or terminated non-safety feature(s) (Block S126). In other words, the power management process of FIG. 7 enables or executes the previously disabled non-life safety feature(s) that may consume more power once power supply 66 is greater than or equal to the threshold such that the non-life safety features consume minimal power from power supply 66. Power supply 66 may rise back to the predetermined threshold level when power supply 66 is being recharged and/or when user interface device 12 is being power via USB, among other situations where power supply 66 is no longer below the predetermined threshold. Alternatively, Blocks S124 and S126 may be skipped or excluded from the power management process of FIG. 7 based on design need, i.e., the process moves from Block S122 directly to Block S128.

If the determination is made that power supply 66 is below threshold, processor 56 determines whether to trigger an alarm such as an audible alarm (Block S128). In particular, an audible alarm may be trigger after processor 56 determines power supply 66 has reached a lower predetermined threshold. For example, the lower predetermined threshold may correspond to a minimum power level needed to trigger siren 64 for a predetermined amount of time and/or shutdown user interface device 12. The lower predetermined threshold may be based on design need. If the determination is made to trigger an alarm, siren 64 and/or siren 40 may be triggered for a predetermined amount of time (Block S136). For example, siren 64 may be triggered for at least four minutes in order to alert a user of user interface device 12 status such as a loss of all power status. The predetermined amount of time the alarm is triggered may be based on design need and/or regulatory requirements. Other criteria may be used to trigger an audible alarm based on design need. After triggering siren 64, user interface device 12 may shut down (Block S138). For example, control unit 16 may perform a graceful shutdown according to a shutdown routine.

Referring back to Block S128, if the determination is made not to trigger an alarm, processor 56 determines whether a feature threshold has been reached (Block S130). The feature threshold may correspond to a back-up power supply 38 level at which another feature may be shutdown in order to reduce power consumption. For example, a difference feature may be terminated every time the power level fails another predetermined amount, e.g., five or ten percent. Moreover, more than one feature may be disabled or terminated at a time. If the determination is made that the feature threshold is not reached, the determination of Step S124 may be repeated. Alternatively, if Block S124 is skipped or excluded from the process and the determination is made that the feature threshold not been reached, the determination of Block S128 may be performed.

If the determination is made that the feature threshold is reach, processor 56 determines whether at least one other non-life safety feature is enabled (Block S132). If the determination is made that at least one other non-life safety feature is not enabled, the determination of Block S124 may be repeated. Alternatively, if Block S124 is skipped or excluded from the process and the determination is made that at least one other non-life-style feature is not enabled, the determination of Block S128 may be repeated, i.e., the process moves from Block S132 to Block S128. If processor 56 determines at least one other non-life safety feature is enabled, processor 56 disables the at least one other life style feature such that the non-life safety features consume less power from power supply 66 (Block S134). The order of which non-life safety features are disabled may vary based on design need and power consumption of individual features or other criteria.

After disabling the at least one other non-life safety feature, the determination of Block S124 may be repeated. Alternatively, if Block S124 is skipped or excluded from the process and the other non-life safety feature has been disabled at Block S134, the determination of Block S128 may be repeated, i.e., the process moves from Block S134 to Block S128. The power management process helps ensure more important or safety dependent features remain operating by terminating or disabling less important features such as life style features or other non-safety features at user interface device 12. Alternatively, processor 56 may disable more than one or all life style features at one time. In one embodiment, the power management is configured and power supply 66 sized such that processor 56 can still trigger and sound siren 64 for four minutes after a twenty-four hour period upon the occurrence of a triggering condition, e.g., low battery, sensor trigger detection, receipt of trigger message from control unit 16, etc.

An example monitoring process is described with reference to FIG. 8. Processor 44 determines resource usage over a predetermined time period (Block S140). For example, processor 44 may track memory and/or processing usage over a predetermined time period. The length of the time period may be based on design implementation. Processor 44 determines whether the determined resource usage is greater than a predefined usage threshold (Block S142). The usage threshold may depend on design implementation. For example, the life style application may use a fixed, pre-allocated heap size of 128 MB, with 8 MB of complier cache. In one embodiment, JVM 73 uses less than 16 MB for typical operation. In one embodiment, supporting daemons uses less than 8 MB of memory. Life style application, i.e., code, have a dedicated RAM file system, which may be limited to 16 MB. The life style system may thus only use 176 MB out of a total system memory of 512 MB, with 256 MB allocated for the life safety application. Therefore, in one embodiment, the usage threshold for life style application/code is set at 176 MB.

If processor 44 determines the determined resource usage is not greater than the usage threshold, the monitoring process may end or may return to Block S140. If processor 44 determines the determined resource usage is greater than the usage threshold, processor 44 shuts down at least one life style operation (Block S144). In one embodiment, processor 44 may shutdown all life style operations. In another embodiment, processor 44 may shutdown the most resource intensive lifestyle operation. The monitoring process may end after processor 44 has shutdown at least one life style operation the monitoring process may end. Alternatively, processor 44 may perform the determination of Block S140. For example, if processor 44 does not shutdown all life style operations, processor 44 may loop back to Block S140, thereby allowing processor 44 to shut down more life style operations if the resource usage is still above the usage threshold. The monitoring process advantageously helps prevent any resource over-consumption from life style code from consuming resources needed by life safety code, thereby help prevent life style operations from interfering with life safety operations. In other words, the resources needed for life safety operation should be available when needed, regardless of the effect on life style functionality.

Figure 9:
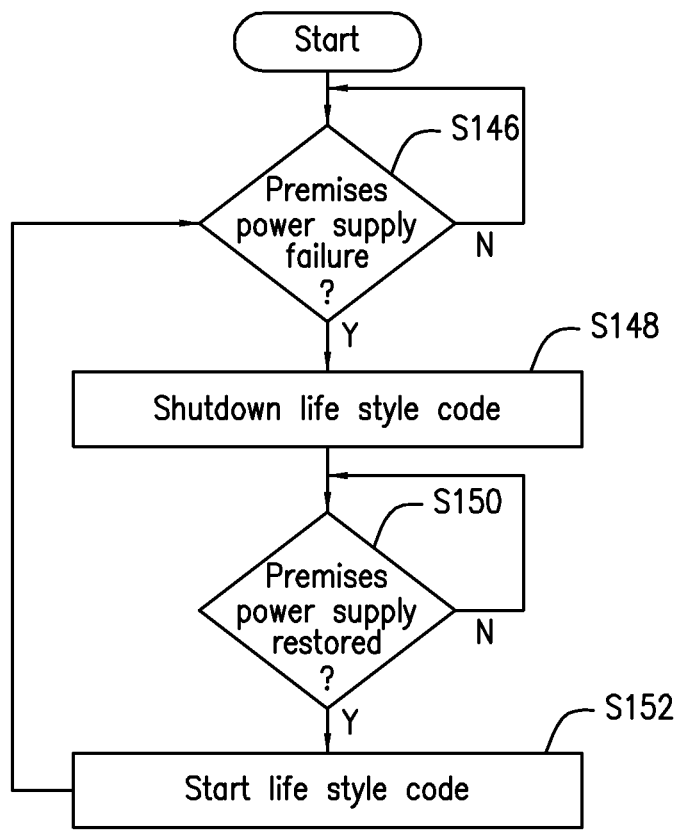
FIG. 9 is a flow chart of an example backup process of the invention in accordance with the principles of the invention.

An example backup process for shutting down life style operations or code 78 based at least in part on power supply status is described with reference to FIG. 9. Power may be considered a special case of joint resource utilization between life safety and life style operations. Running life style code should not cause a power interruption to life safety code including preventing life style code from using any batter power, e.g., backup power supply 38 power, needed for life safety operation and/or rebooting the system.

Processor 44 determines whether a premises power supply 36 failure has occurred (Block S146). For example, processor 44 determines whether power supplied by premises power supply 36 is below a threshold, i.e., has failed, and/or whether control unit 16 is being powered by backup power supply 38. If processor 44 determines premises power supply 36 has not failed, processor 44 may perform the determination of Block S146, e.g., processor 44 may periodically repeat the determination of Block S146. If processor 44 determines premises power supply 36 has failed, processor 44 shuts down at life style code, i.e., operations (Block S148). Premises power supply failure may include failing below a power threshold, not operating properly and/or total inoperability. In one embodiment, processor 44 shuts down all life style code. Processor 44 may shut down life style hardware such as Wi-Fi and/or ZWave hardware, among other hardware at control unit 16, thereby helping prevent possible wakes and power consumption dealing with life style events and operations from consuming battery power needed for at least 24 hours. Life style code may also be prevented from performing any power operations directly.

Processor 44 determines whether premises power supply 36 has been restored (Block S150). If premises power supply 36 has not been restored, processor 44 performs the determination of Block S150, e.g., processor 44 may periodically perform the determination of Block S150. If processor 44 determines premises power supply 36 has been restored, i.e., premises power supply 36 is above a threshold, processor 44 may start life style code, i.e., restart shut down life style operations. After restarting life style code, processor 44 may return to Block S146. By shutting down life style code, control unit 16 is able to help provide proper Electrical Testing Labs (ETL) 24 hour operation during AC power loss.

An example radio frequency (RF) validation process for RF validation module 56 is described with reference to FIG. 10. User interface devices 12, premises devices 14 and control unit 16 may be designed to help prevent RF interference between life style and life safety hardware by channel separation and antenna design. RF validation module 56 advantageously allows validation that no interference or no substantive interference between life safety radios operating approximately at 345 MHz and life style radios such as Z-Wave radio operating at approximately 908 MHz and Wi-Fi radios operating at approximately 2.4 GHz. Other radios at other operating frequencies may also be tested.

Processor 44 causes all radios such as life style radios and life safety radios at the premises to be activated (Block S154). In one embodiment, at least one radio is periodically triggered such as periodically triggering a ZWave switch. In another embodiment, at least one radio is continuously in use, e.g., stream video from camera. Processor 44 determines an amount of interference between radio(s) of life safety devices and radio(s) of life style devices (Block S156). Processor 44 determines whether the determined amount of interface is less than a predefined interference threshold (Block S158). If processor 44 determines the determined interference is less than the interference threshold, processor 44 may cause a report to be generated and/or transmitted. Alternatively, processor 44 may skip Block S160.

After Block S158 and/or S160, processor 44 may return all radios to their previous operational state. Alternatively, processor 44 may return all radios to a predefined system configuration. Referring back to Block S158, if processor 44 determines the determined amount of interference is greater than the predefined interference threshold, processor 44 may cause a report to be generated (Block S164). The report may include an alert and data related determined amount of interference. Processor 64 may change the state of one or more radios if the determined amount of interference is greater than the predefined interference threshold.

Figure 11:
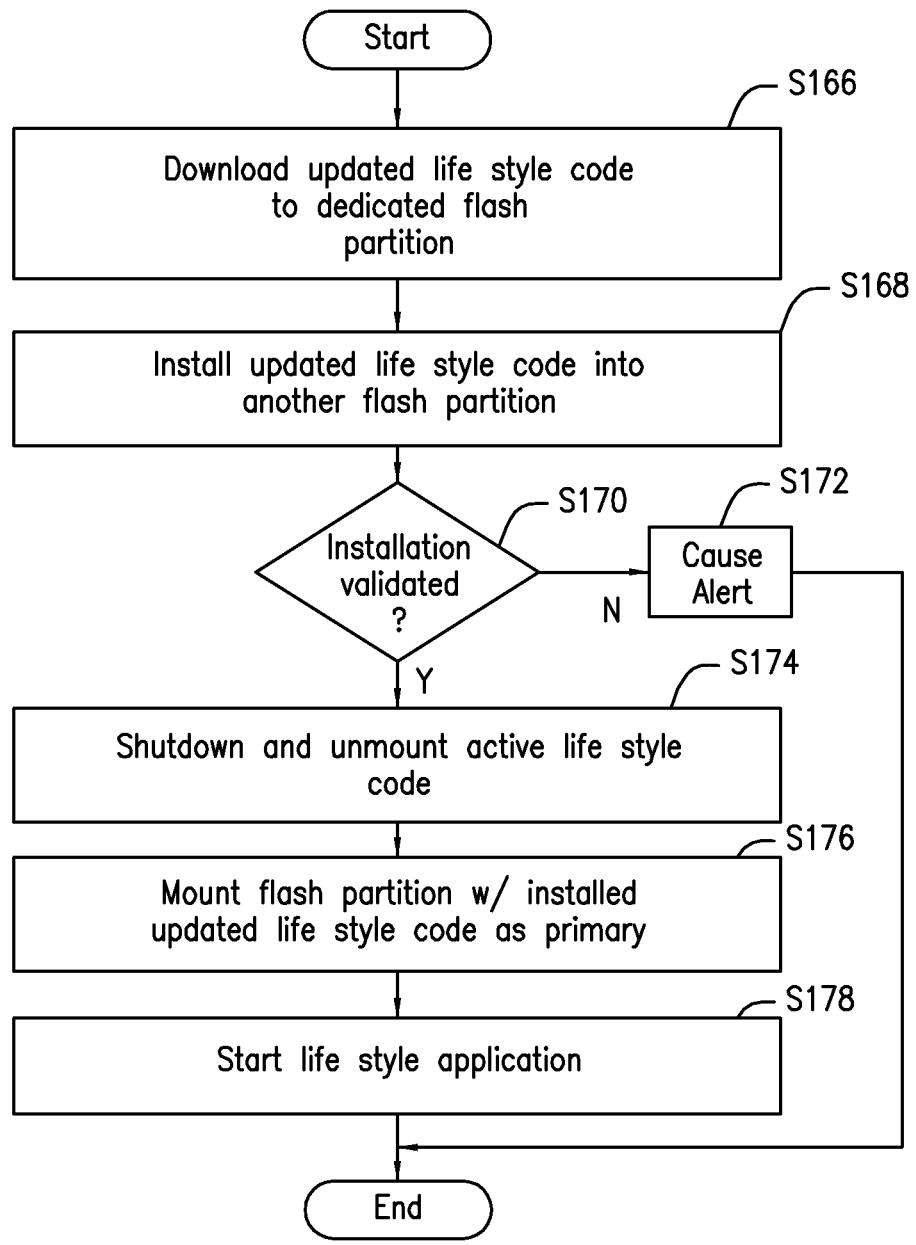
FIG. 11 is a flow chart of an example upgrade process in accordance with the principles of the invention.

An example software upgrading process of upgrade module 58 is described with reference to FIG. 11. Processor 44 causes at least one life style file to be downloaded to a dedicated flash partition in memory 46 (Block S166). For example, life style upgrades may be received from remote monitoring center 20 and/or remote server 22 over network 18. In one embodiment, remoter server 22 indicates from where to download the life style code/file and how to validate the code. Processor 44 causes the installation of updated life style code into another flash partition in memory 46 different from the flash partition of the downloaded file, i.e., the updated life style code is stored to a third partition in the memory 46 (Block S168). Processor 44 determines whether the installation is valid (Block S170). If processor 44 determines the installation is not valid, processor 44 may cause an alert to be generated. The life safety code or software 70 may continue to operate normally even if the life style code is not validated. The updated life style code is installed into a fourth partition in the memory. The partition used for the prior download, e.g., the third partition, as well as the partition used for installation of the prior life style code, e.g., the second partition (before the update) are then available for a subsequent update.

Referring back to Block S170, if processor 44 determines the installation is valid, processor may shutdown and unmounts the active life style code 78 in memory 46 (Block S174). After shutting down and unmount active life style code 78, processor 44 may mount the flash partition with the new software image or installed updated life style code/file as primary life style code 78 (Block S176). After the mounting, processor 44 may cause the life style application to start (Block S178). The life style application may proceed with a predefined startup process. By separating life style software 68 and life safety software 70, life style code 78 and/or life style data 80 can advantageously to be upgraded separately from the life safety code 82 and/or data 84. The upgrade process does not affect life safety operation such that life style code may be periodically updated or modified without affecting life safety operation and/or life safety code. In one embodiment, processor 44 may close down sockets used by life safety to communicate with the life style code. The closed down sockets may eventually reconnect with the newly mounted life style code.

Further, life style devices can be installed numerous ways. In one embodiment, an installer application running locally may communicate with control unit 16 to install ZWave and/or WiFi devices. In one embodiment, control unit 16 supports a maximum installation of a total of 250 devices divided between life safety zones, ZWave devices, cameras. In one embodiment, a maximum of ten cameras is supported.

Further, processor 44 may perform testing based at least in part on at least one of modules RF validation module 56 and upgrade module 58, among other modules. For example, control unit 16 may validate life style operation does not interfere with life safety operations but perform ETL operational testing. The ETL operational testing may include enrollment of at least one user interface device 12 and/or premises device. In one embodiment, processor 44 may cause a camera and a ZWave device to be enrolled with control unit 16. Processor may then perform the upgrading processor described above with respect to FIG. 11. Performing the upgrading process validates whether the upgrade functionality and code separation design of control unit 16. After performing the updating process, processor 44 may cause live video to be streamed over network 18 such that potential RF interactions ZWave subsystems can be validated. Processor may periodically trigger ZWave switch in order to validate potential RF interactions and the ZWave subsystems. In one embodiment, processor 44 may perform live video streaming and periodic ZWave trigger at the same time.

The invention advantageously allows the control unit 16 to validate the designed lack of interaction/interference between life style operations and life safety operations. Such interactions may include radio interactions between wireless life safety sensors and life style network, e.g., Wi-Fi and Zwave, resource contention between life safety code and life style code, power cycling/usage caused by life style code, among other interactions. Radio interactions may include any interference with the wireless sensors used for life safety operation, any electrical interactions inside the board and/or any interactions with the cellular signal used for alarm reporting. The operation of life style radio hardware, e.g., Wi-Fi and ZWave, should not degrade the performance of any life safety radios in which control unit 16 may validate there is no such degradation.

The invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A control apparatus for a premises based system, the control apparatus comprising:
    a memory configured to store life safety code and life style code;
    a processor configured to:
        operate the life safety code, the life safety code relating to code that manages a response of the system to at least one harmful premises condition; and
        operate the life style code, the life style code relating to code that manages a response of the system to at least one non-harmful premises condition; and
    the memory and processor are configured for separate operation of the life safety and life style code for changing the operation of the life style code without changing the operation of the life safety code, a virtual machine being configured to provide the separate operation of the life safety code and life style code on the processor.

2. The control apparatus of claim 1, wherein the processor is further configured to:
    determine resource usage for life style functions associated with life style code;
    determine whether resource usage exceeds a predefined resource threshold; and
    if the resource usage is determined to exceed the predefined resource threshold, shut down at least one life style function.

3. The control apparatus of claim 2, wherein resource usage includes at least one of memory usage and computing resource usage.

4. The control apparatus of claim 1, further comprising:
    a wireless communication element configured to support a plurality of wireless communication protocol radios;
    a premises power supply, the premises power supply configured to supply power to the control apparatus;
    a backup power supply, the backup power supply configured to provide power to the control apparatus during failure of the premises power supply; and
    the processor being further configured to:
        determine if the premises power supply has failed; and
        shut down at least one life style function and corresponding wireless communication protocol radio in response to the determined failure of the premises power supply.

5. The control apparatus of claim 1, further comprising a wireless communication element configured to support a plurality of wireless communications protocols, the wireless communication element including a plurality of wireless communication protocol radios, the plurality of wireless communication radios including at least one life safety radio and at least one life style radio; and
    the processor is further configured to:
        activate all wireless communication radios;
        determine an amount of interference between the at least one life style radio and at least one life safety radio; and
        generate an alert if the amount of interference exceeds a predefined interference threshold.

6. The security control apparatus of claim 1, further comprising at least one socket for communicating between life style code and life safety code; and
    the processor is further configured to close down the at least one socket during the changing of life style code.

7. A control apparatus for a premises based system, the control apparatus comprising:
    a memory configured to store life safety code and life style code;

a processor configured to:
   operate the life safety code, the life safety code relating to code that manages a response of the system to at least one harmful premises condition; and
   operate the life style code, the life style code relating to code that manages a response of the system to at least one non-harmful premises condition;
the memory and processor are configured for separate operation of the life safety and life style code for changing the operation of the life style code without changing the operation of the life safety code, wherein the life style code is stored in a first partition in the memory and the life safety code is stored in a second partition in the memory different from the first partition, the processor is further configured to modify at least a portion of the life style code in the first partition; and
the modification of the life style code includes:
   receiving updated life style code;
   storing the updated life style code to a third partition in the memory;
   installing the updated life style code into a fourth partition in the memory;
   shutting down and unmounting the life style code from the first partition; and
   mounting the installed updated life style code for operation by the processor.

8. The control apparatus of claim 7, wherein the processor is further configured to:
determine resource usage for life style functions associated with life style code;
determine whether resource usage exceeds a predefined resource threshold; and
if the resource usage is determined to exceed the predefined resource threshold, shut down at least one life style function.

9. The control apparatus of claim 8, wherein resource usage includes at least one of memory usage and computing resource usage.

10. The control apparatus of claim 7, further comprising:
a wireless communication element configured to support a plurality of wireless communication protocol radios;
a premises power supply, the premises power supply configured to supply power to the control apparatus;
a backup power supply, the backup power supply configured to provide power to the control apparatus during failure of the premises power supply; and
the processor being further configured to:
   determine if the premises power supply has failed; and
   shut down at least one life style function and corresponding wireless communication protocol radio in response to the determined failure of the premises power supply.

11. The control apparatus of claim 7, further comprising a wireless communication element configured to support a plurality of wireless communications protocols, the wireless communication element including a plurality of wireless communication protocol radios, the plurality of wireless communication radios including at least one life safety radio and at least one life style radio; and
the processor is further configured to:
   activate all wireless communication radios;
   determine an amount of interference between the at least one life style radio and at least one life safety radio; and
   generate an alert if the amount of interference exceeds a predefined interference threshold.

12. The security control apparatus of claim 7, further comprising at least one socket for communicating between life style code and life safety code; and
the processor is further configured to close down the at least one socket during the changing of life style code.

13. A method for a control apparatus of a premises based system, the method comprising:
storing life safety code in a first partition in memory, the life safety code relating to code that manages a response of the system to at least one harmful premises condition;
storing life style code in a second partition in memory different from the first partition, the life style code relating to code that manages a response of the system to at least one non-harmful premises condition; and
causing the operation of the life style code to be changed while the operation of the life safety code remains unchanged, the changing of the operation of the life style code includes:
   receiving updated life style code;
   storing the updated life style code to a third partition in the memory;
   installing the updated life style code into a fourth partition in the memory;
   shutting down and unmounting the stored life style code; and
   mounting the installed updated life style code for operation by the processor.

14. The method of claim 13, further comprising:
determining resource usage for life style functions associated with life style code; and
determining whether resource usage exceeds a predefined resource threshold; and
if the resource usage is determined to exceed the predefined resource threshold, shutting down at least one life style function.

15. The method of claim 14, wherein resource usage includes at least one of memory usage and computing resource usage.

16. The method of claim 13, wherein the control apparatus includes:
a wireless communication element configured to support a plurality of wireless communication protocol radios;
a premises power supply, the premises power supply configured to supply power to the control apparatus; and
a backup power supply, the backup power supply configured to provide power to the control apparatus during failure of the premises power supply; and
the method further comprising:
   determining if the premises power supply has failed; and
   shutting down at least one life style function and corresponding wireless communication protocol radio in response to the determined failure of the premises power supply.

17. The method of claim 13, wherein the control apparatus includes a wireless communication element having at least one life safety radio and at least one life style radio; and
the method further comprises:
   activating at least one life safety radio and at least one life style radio;
   determining an amount of interference between the at least one life style radio and at least one life safety radio; and
   generating an alert if the amount of interference exceeds a predefined interference threshold.

18. The method of claim 13, wherein the control apparatus includes at least one socket for communicating between life style code and life safety code; and wherein the changing of life style code includes closing down the at least one socket.

19. A system, the system comprising:
a remote server, the remote sever configured to store updated life style code configured to support life style features; and
a premises based control apparatus, the control apparatus including:
  a remote communication element, the remote communication element configured to receive at least a portion of the updated life style code from the remote server;
  a memory configured to store life safety code relating to code that manages a response of the system to at least one harmful premises condition and life style code relating to code that manages a response of the system to at least one non-harmful premises condition;
  a processor configured to operate the life safety code and life style code; and
  the memory and processor are configured for separate operation of the life safety and life style code for changing the operation of the life style code based at least in part on the received updated life style code without changing the operation of the life safety code.

20. The system of claim 19, wherein the life style code is stored in a first partition in memory and the life safety code is stored in a second partition in the memory; and the changing is based at least in part on the updated life style code includes:
  storing the updated life style code to a third partition in the memory;
  installing the updated life style code into a fourth partition in the memory;
  shutting down and unmounting the life style code from the first partition; and
  mounting the installed updated life style code for operation by the processor.

21. The system of claim 19, wherein the processor is further configured to:
  determine resource usage for life style functionality associate with life style code, the resource usage including at least one of memory usage and computing resource usage;
  determine whether resource usage exceeds a predefined resource threshold; and
  if the resource usage is determined to exceed the predefined resource threshold, shut down at least one life style function.

22. The system of claim 19, wherein the control apparatus further comprises at least one socket for communicating between life style code and life safety code; and
  the processor is further configured to close down the at least one socket during the updating of life style code.

23. The system of claim 19, wherein the control apparatus further comprises a wireless communication element supporting a plurality of wireless communications protocols, the wireless communication element including a plurality of wireless communication protocol radios, the plurality of wireless communication radios including at least one life safety radio and at least one life style radio; and
  the processor is further configured to:
    activate all wireless communication radios;
    determine an amount of interference between the at least one life style radio and at least one life safety radio; and
    generate an alert if the amount of interference exceeds a predefined interference threshold.

* * * * *